April 4, 1950 F. Q. RAST ET AL 2,502,991
ODOGRAPH
Filed May 15, 1945 18 Sheets-Sheet 1

INVENTORS
FREDERICK Q. RAST
ALFRED B. BENSON
BY
W. M. Wilson
ATTORNEY

April 4, 1950 F. Q. RAST ET AL 2,502,991
ODOGRAPH
Filed May 15, 1945 18 Sheets-Sheet 2

INVENTORS
FREDERICK Q. RAST
ALFRED B. BENSON
BY
W M Wilson
ATTORNEY

April 4, 1950

F. Q. RAST ET AL 2,502,991

ODOGRAPH

Filed May 15, 1945

INVENTORS
FREDERICK Q. RAST
ALFRED B. BENSON
BY
W. M. Wilson
ATTORNEY

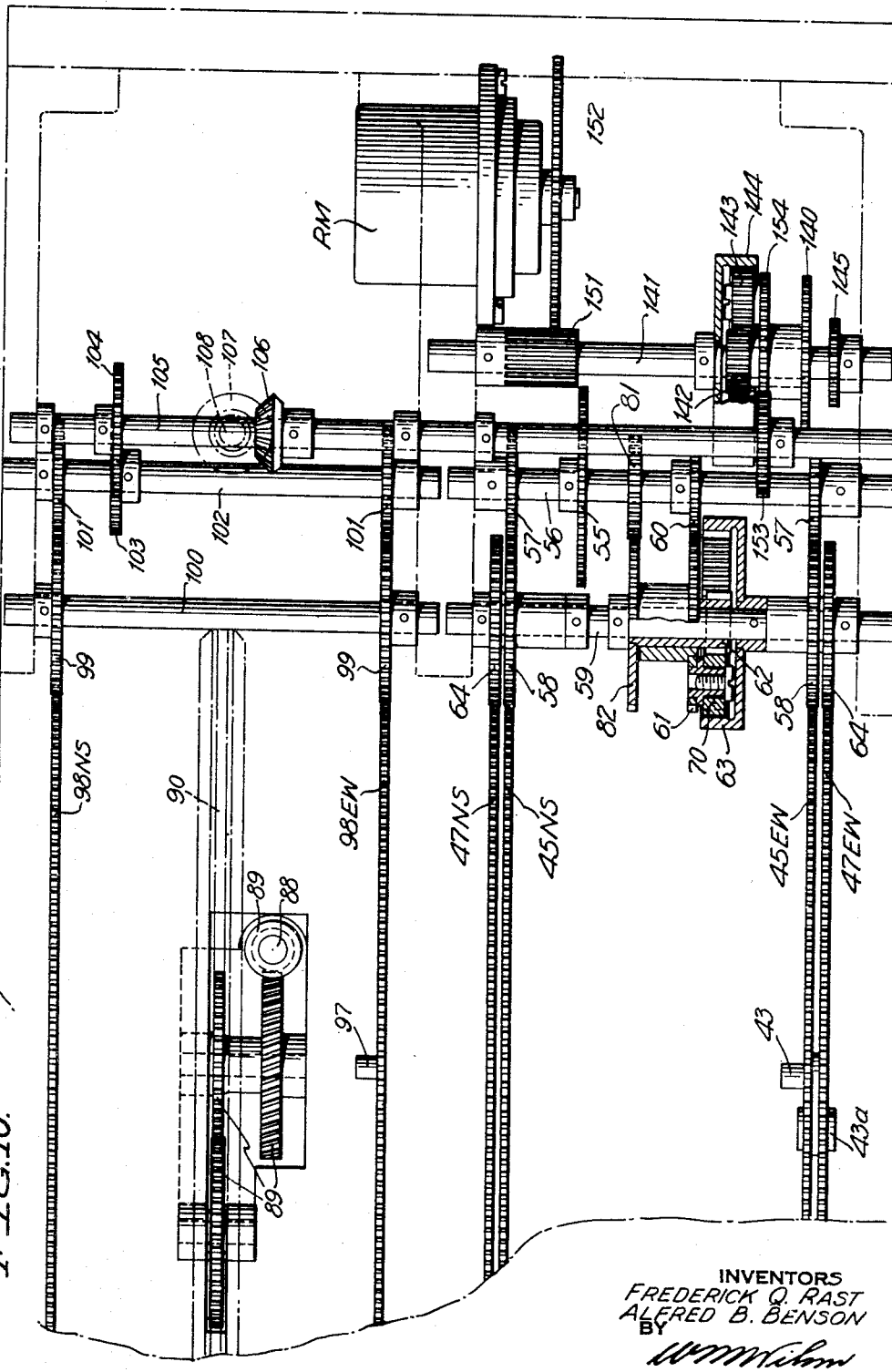

April 4, 1950 F. Q. RAST ET AL 2,502,991
ODOGRAPH
Filed May 15, 1945 18 Sheets-Sheet 11
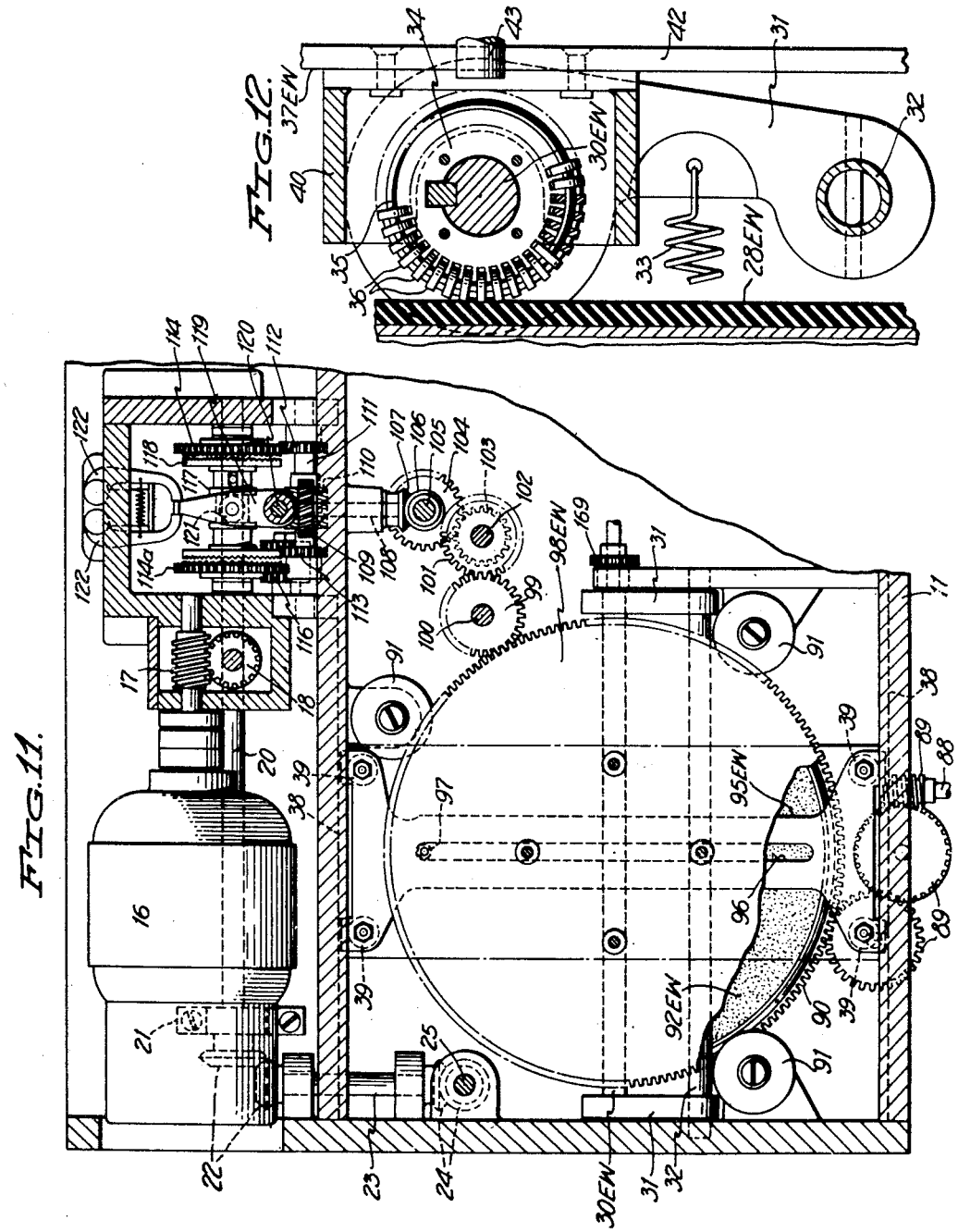
INVENTORS
FREDERICK Q. RAST
ALFRED B. BENSON
BY
ATTORNEY April 4, 1950      F. Q. RAST ET AL      2,502,991
ODOGRAPH
Filed May 15, 1945      18 Sheets—Sheet 12
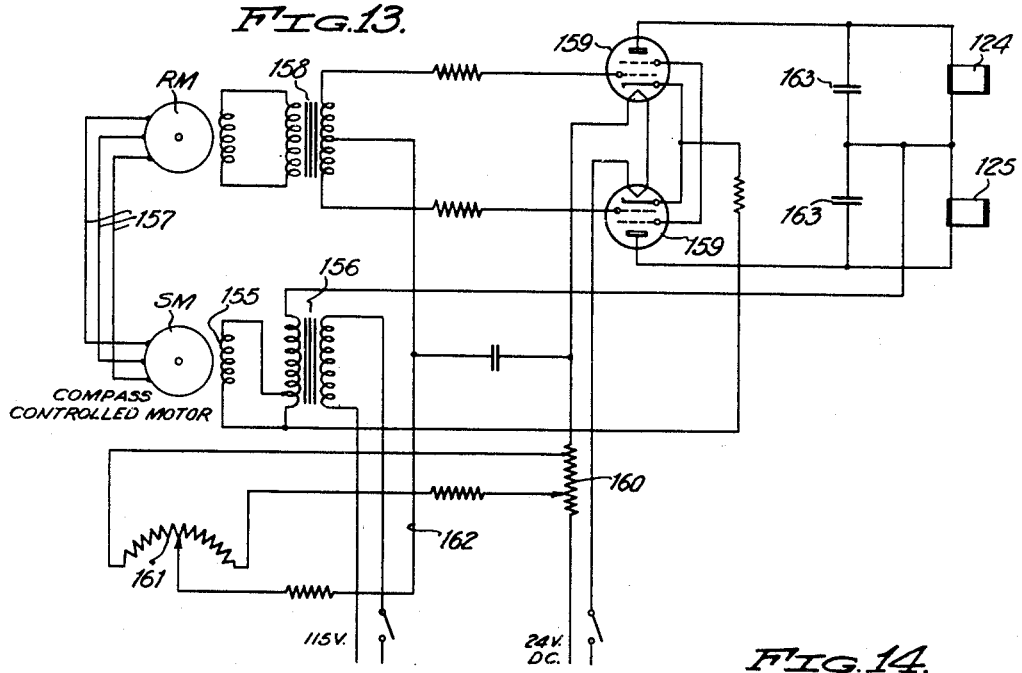
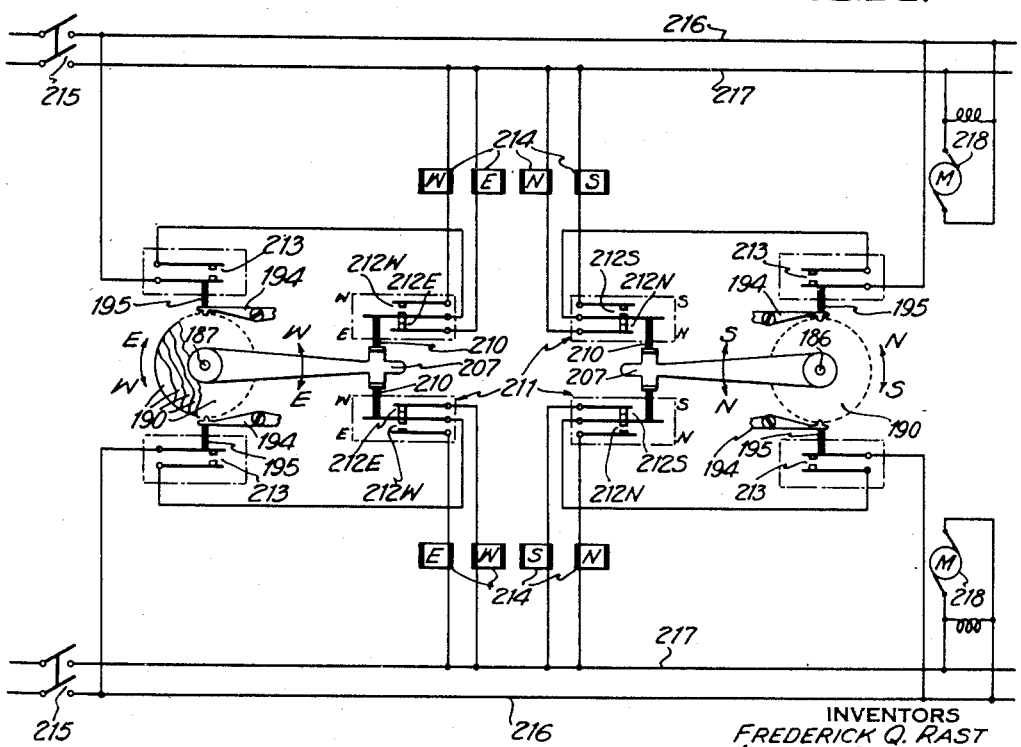
INVENTORS
FREDERICK Q. RAST
ALFRED B. BENSON
BY
ATTORNEY

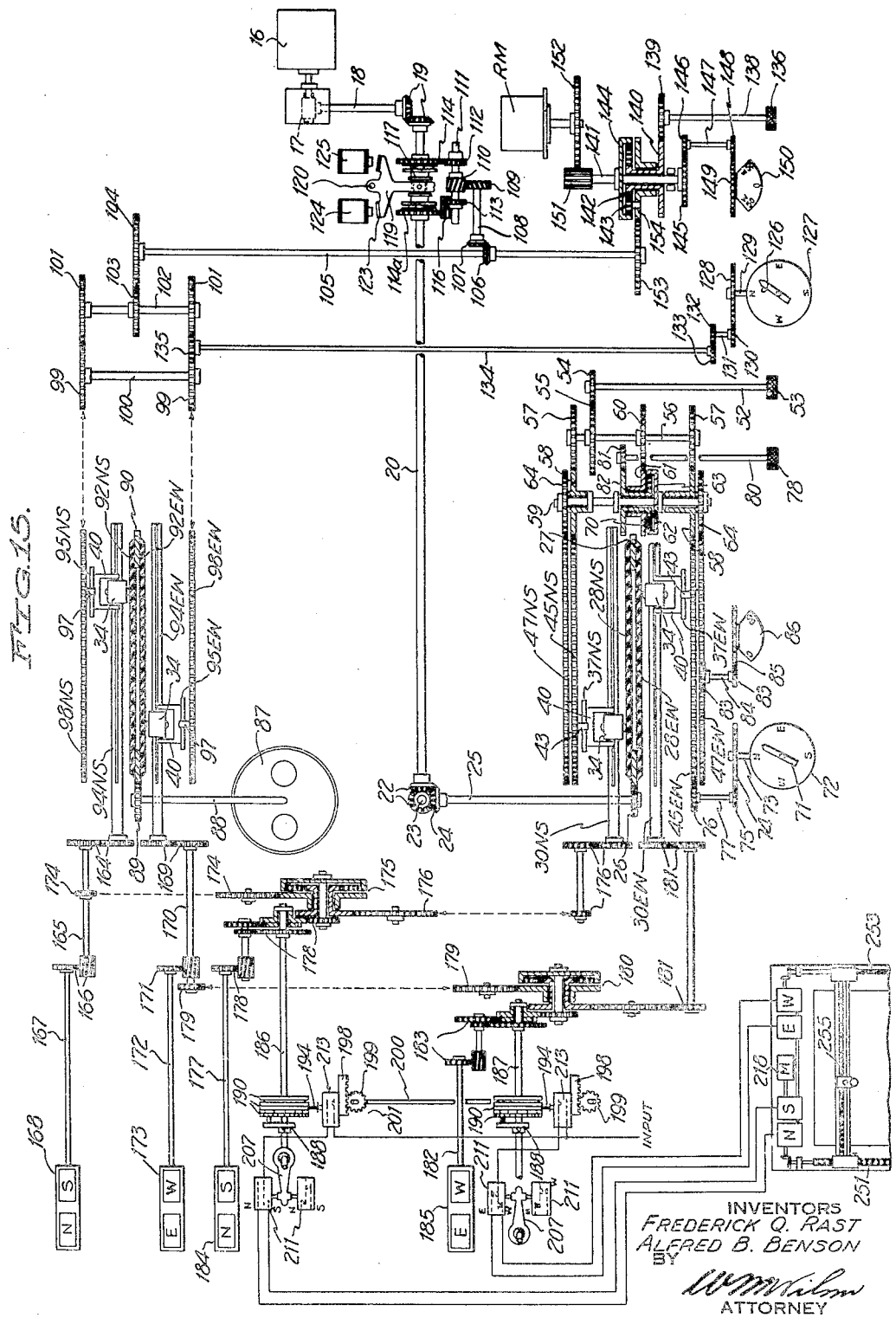

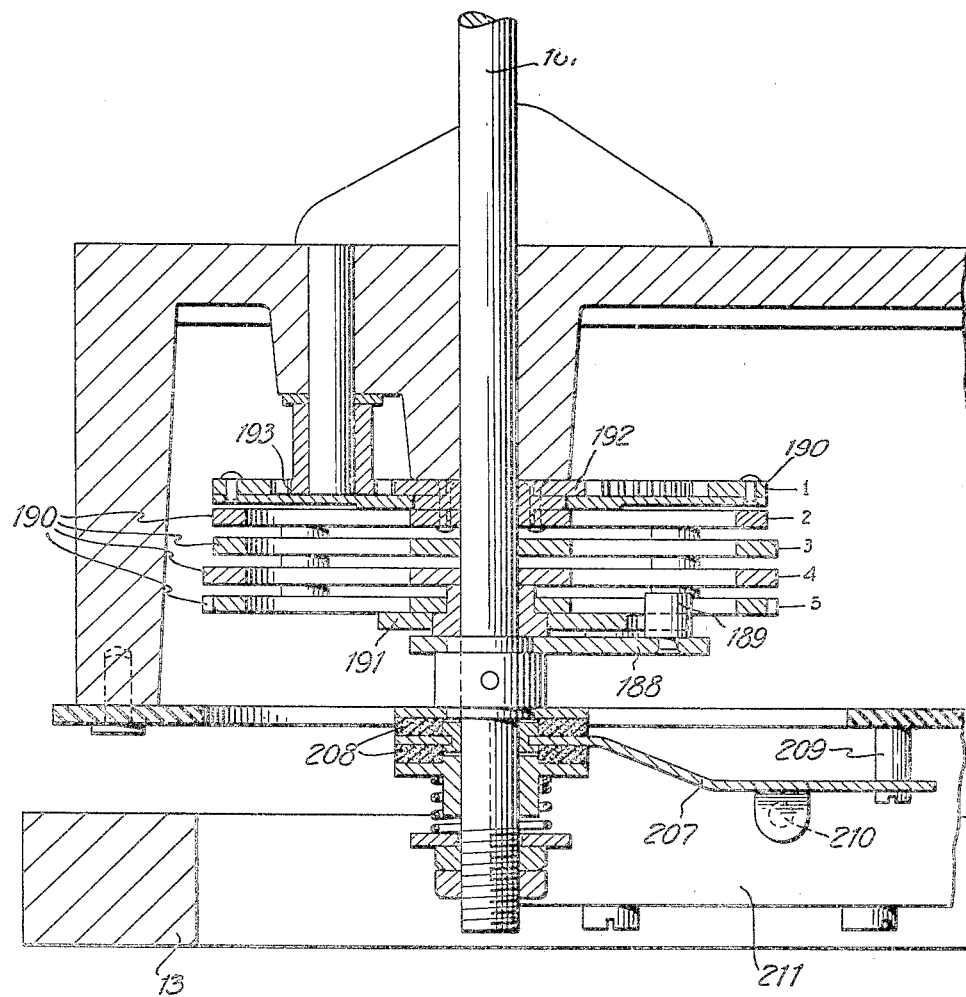

April 4, 1950

F. Q. RAST ET AL 2,502,991

ODOGRAPH

Filed May 15, 1945

INVENTORS
FREDERICK Q. RAST
ALFRED B. BENSON
BY
ATTORNEY

April 4, 1950
F. Q. RAST ET AL
2,502,991
ODOGRAPH
Filed May 15, 1945
18 Sheets-Sheet 16
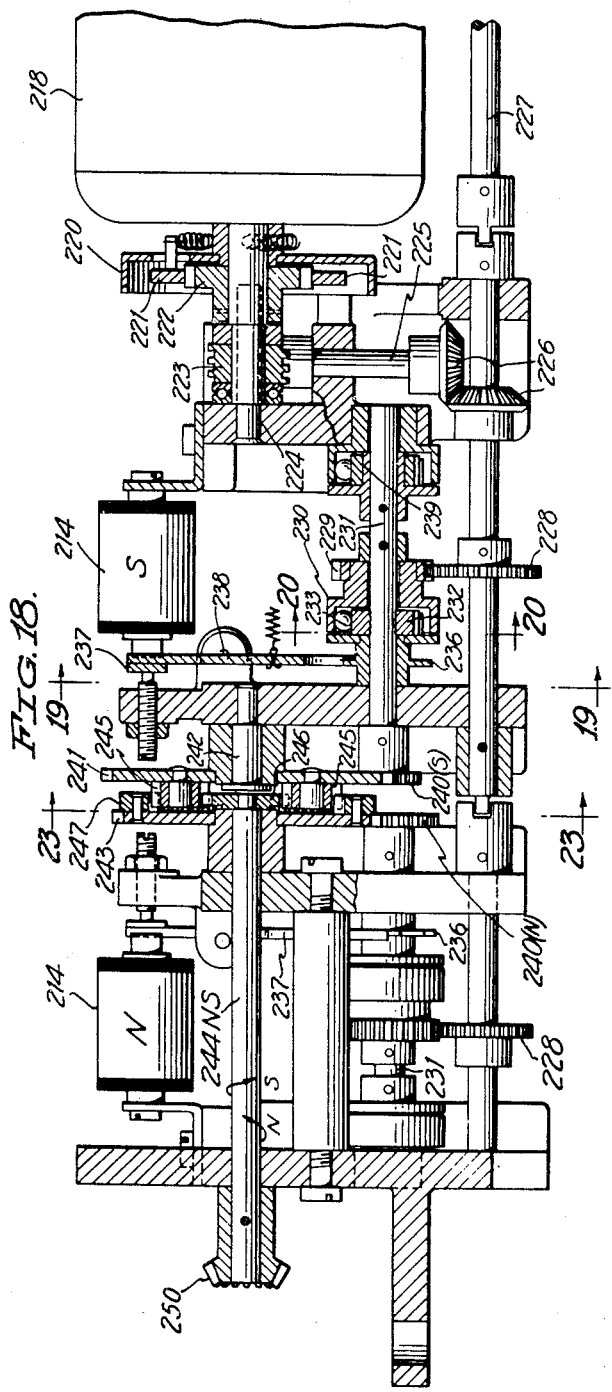
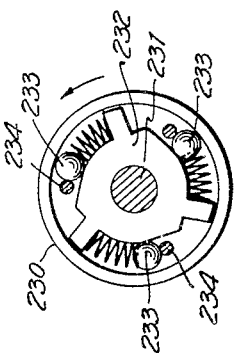
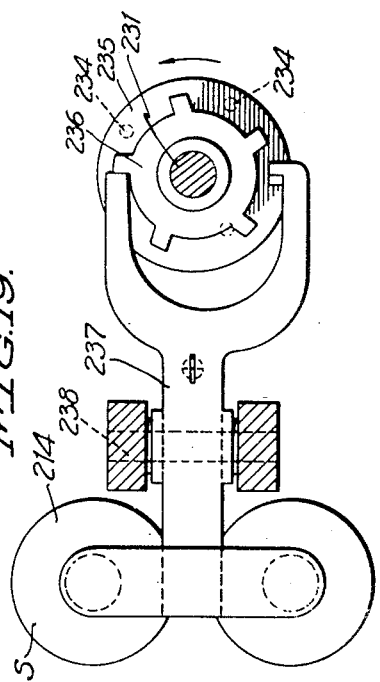
INVENTORS
FREDERICK Q. RAST
ALFRED B. BENSON
BY
*W M Wilson*
ATTORNEY April 4, 1950
F. Q. RAST ET AL
2,502,991
ODOGRAPH
Filed May 15, 1945
18 Sheets-Sheet 17
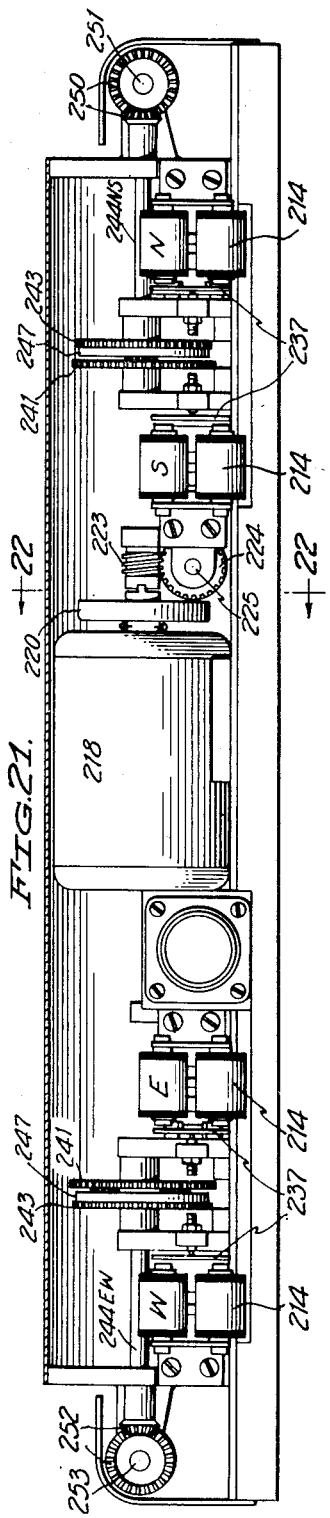
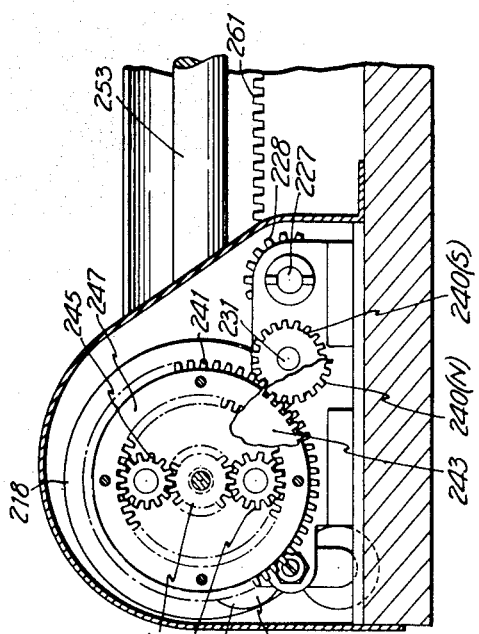
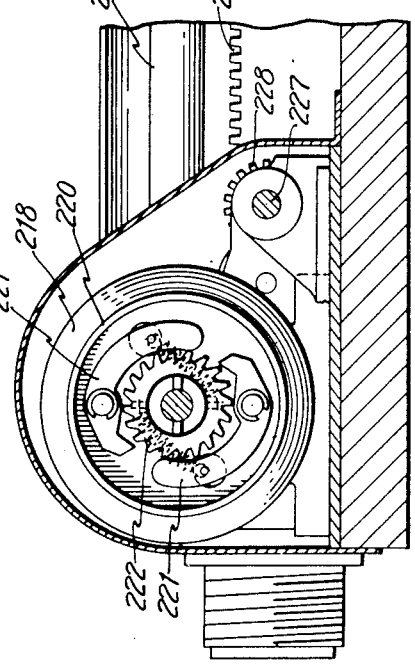
INVENTORS
FREDERICK Q. RAST
ALFRED B. BENSON
BY
*W. M. Wilson*
ATTORNEY April 4, 1950      F. Q. RAST ET AL      2,502,991
ODOGRAPH
Filed May 15, 1945      18 Sheets-Sheet 18
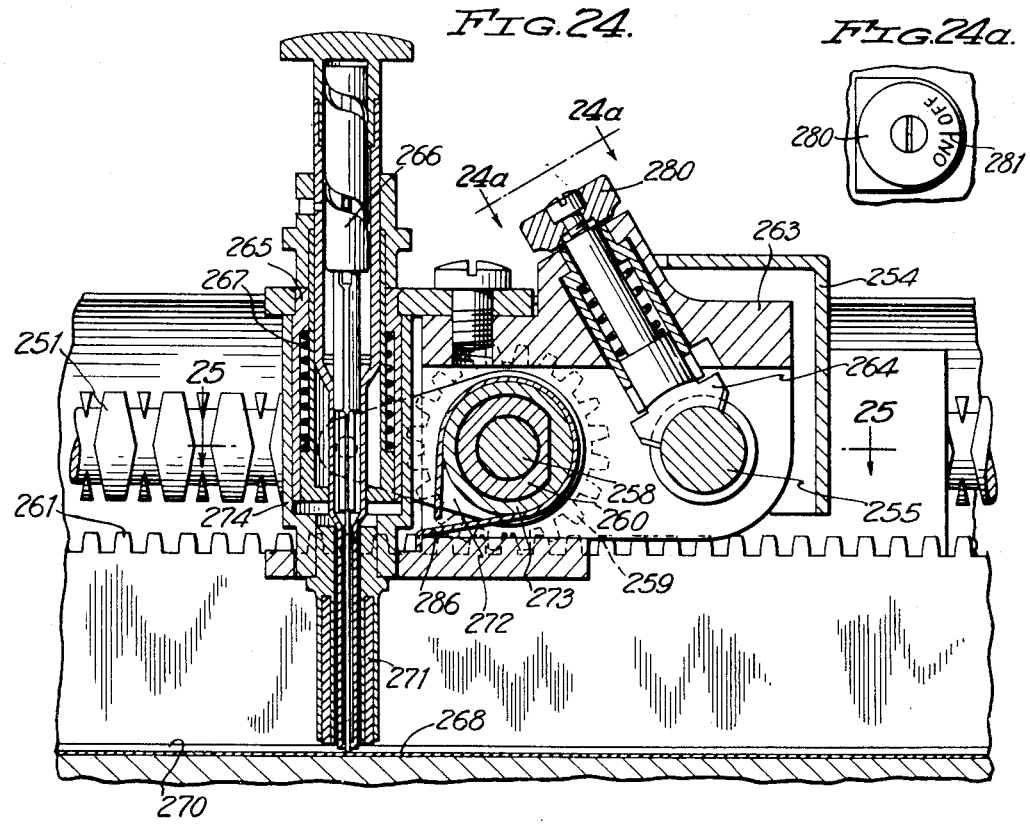
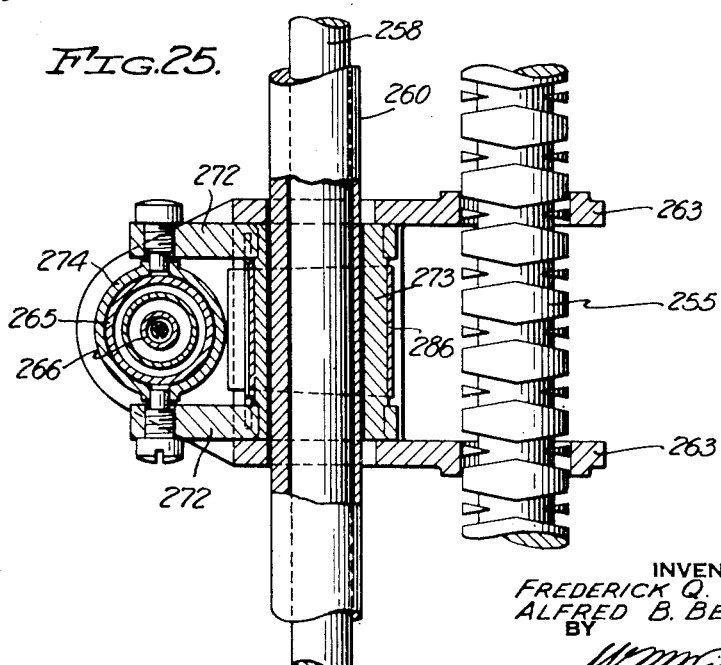
INVENTORS
FREDERICK Q. RAST
ALFRED B. BENSON
BY
ATTORNEY Patented Apr. 4, 1950

2,502,991

UNITED STATES PATENT OFFICE 2,502,991

ODOGRAPH

Frederick Q. Rast, Chicago, Ill., and Alfred B. Benson, Union, N. Y., assignors to International Business Machines Corporation, New York, N. Y., a corporation of New York Application May 15, 1945, Serial No. 593,944

8 Claims. (Cl. 346—33)

1

This invention relates to odographs and more particularly to odographs for use in airplanes.

The principal object of the invention is to provide an integrating and recording instrument of improved construction and operation.

The apparatus of the invention includes an integrating unit provided with automatic input devices for direction and mileage and manual input devices for wind direction and mileage. Provision is also made for manually introducing magnetic variation, so that the counters and odograph plot are relative to true north rather than magnetic north. From this data, counters are controlled to indicate instantaneous position of the aircraft. One set of counters shows the air position in actual miles flown and another set shows the ground miles which is air miles corrected for wind direction and velocity.

The apparatus also includes a pair of remotely controlled recording or plotting tables, each of which supports a map, chart or plotting sheet upon which the track is plotted. The table, or tables, may be operated at any one of five different map scales. If two tables are used, they may be operated simultaneously at the same or different map scales. For example, this enables the plotting on a small scale on one table while reserving the other for large scale plotting of a small area.

A specific object of the invention resides in the provision of improved mechanism for integrating wind velocity and direction. A constantly driven friction disk drives rollers positionable across the faces of the disk in accordance with predetermined values, to drive a pair of north, south and east, west shafts in direction and at a speed corresponding to the related characteristics of the wind. These values are combined with like values obtained from the values of the plane's direction and velocity to obtain actual values. By disabling the wind integrating mechanism, the recorder will plot a track wherein the wind variables are omitted so that a flight made twice over a given reference point during a noted time interval will produce a track on which the points of passage over the reference point do not coincide (except in the case of no wind). From this track the wind direction and velocity may be computed.

A further object of the invention resides in the provision of novel devices for controlling the recording unit. The integrating unit drives a pair of north, south, and east, west shafts from which are driven contact devices to send electrical impulses corresponding in rate to the rate of the plane's course. Manually positionable mech-

2 anism is provided to enable selection of any of five different impulse rates, whereby to trace the course at different map scales.

The recording unit is provided with impulse responsive directing mechanism to drive the stylus or pencil carriage in increments so that the pencil advances with a step-by-step movement, one step for each impulse received. A particular feature of the recorder resides in the provision of mechanism for automatically reversing the direction of travel of the pencil when it reaches the limits of the plotting area, so that any travel beyond such limits will be recorded within the area but in reverse. Indicators are provided to signal whether the pencil is traveling on a normal course with the plotting area or in reverse.

A further object is to provide improved mechanism for causing the direction devices to follow the setting of a compass controlled motor.

Other objects of the invention will be pointed out in the following description and claims and illustrated in the accompanying drawings, which disclose, by way of example, the principle of the invention and the best mode, which has been contemplated, of applying that principle.

In the drawings:

Fig. 10 is a plan section taken on lines 10—10 of Fig. 3.

Fig. 11 is an elevation taken on lines 11—11 of Fig. 4.

Fig. 12 is an enlarged detail of a drive roller and controlling frame.

Fig. 13 is a wiring diagram of the circuits for controlling the directional clutches in the apparatus.

Fig. 14 is a wiring diagram of the circuits controlled by the integrator unit for sending impulses to the recording unit.

Fig. 15 is a diagrammatic view of the gear and drive connections in the integrating apparatus.

Fig. 16 is an enlarged detail of a set of impulse cams.

Fig. 18 is an enlarged plan of one section of the recorder clutch and drive mechanism.

Fig. 19 is a section on lines 19—19 of Fig. 18 showing the escapement.

Fig. 20 is a section on lines 20—20 of Fig. 18 showing the clutch.

Fig. 21 is a rear elevation of the recording unit.

Fig. 22 is a section on lines 22—22 of Fig. 21.

Fig. 23 is a section on lines 23—23 of Fig. 18.

Fig. 24 is a sectional elevation through the stylus.

Figs. 24a is a plan on lines 24a—24a of Fig. 24.

Fig. 25 is a section on lines 25—25 of Fig. 24.

Figure 1:
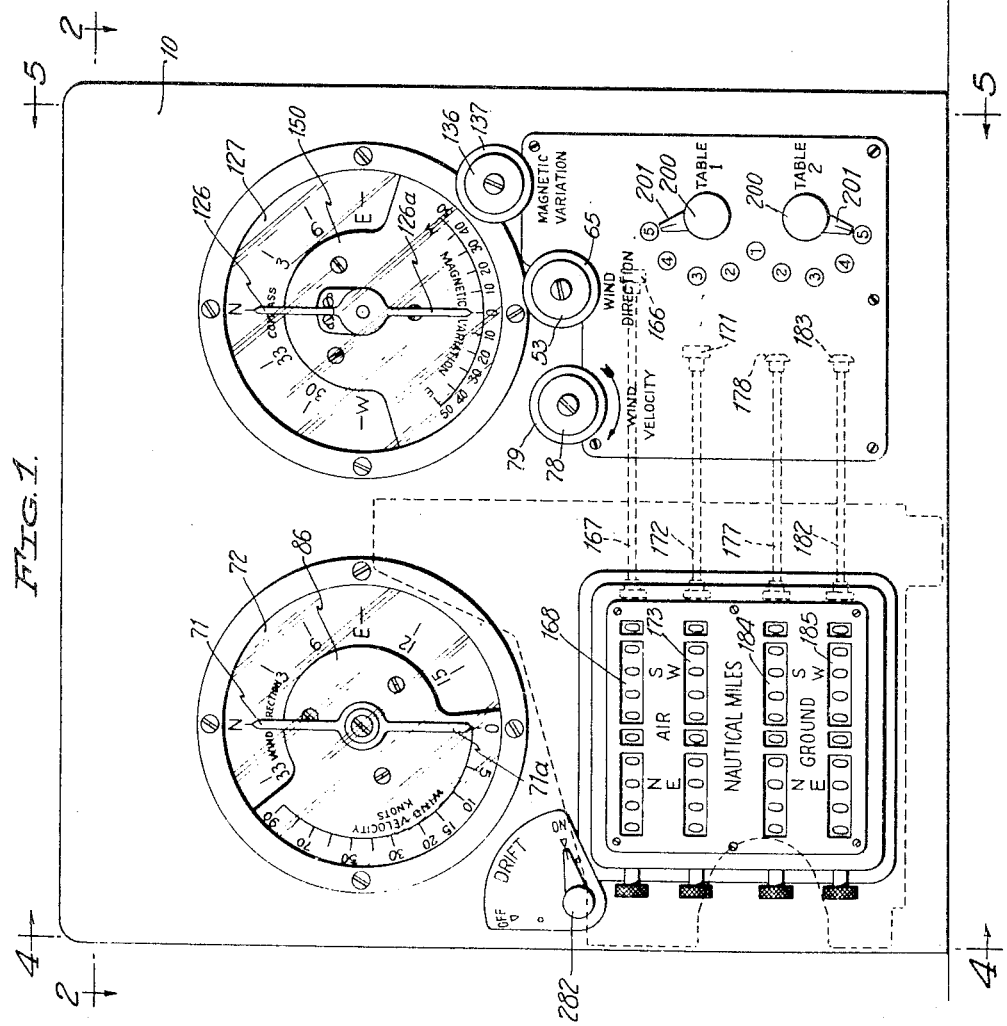
Fig. 1 is a front elevation of the integrating unit showing the location of the several dials and counters.

The illustrative apparatus desirably comprises a housing 10 encasing base frame 11 (Figs. 3 and 4), left side frame 12, right side frame 13, rear frame 14, and cross frame 15, upon which frames all of the mechanism is supported.

Figure 2:
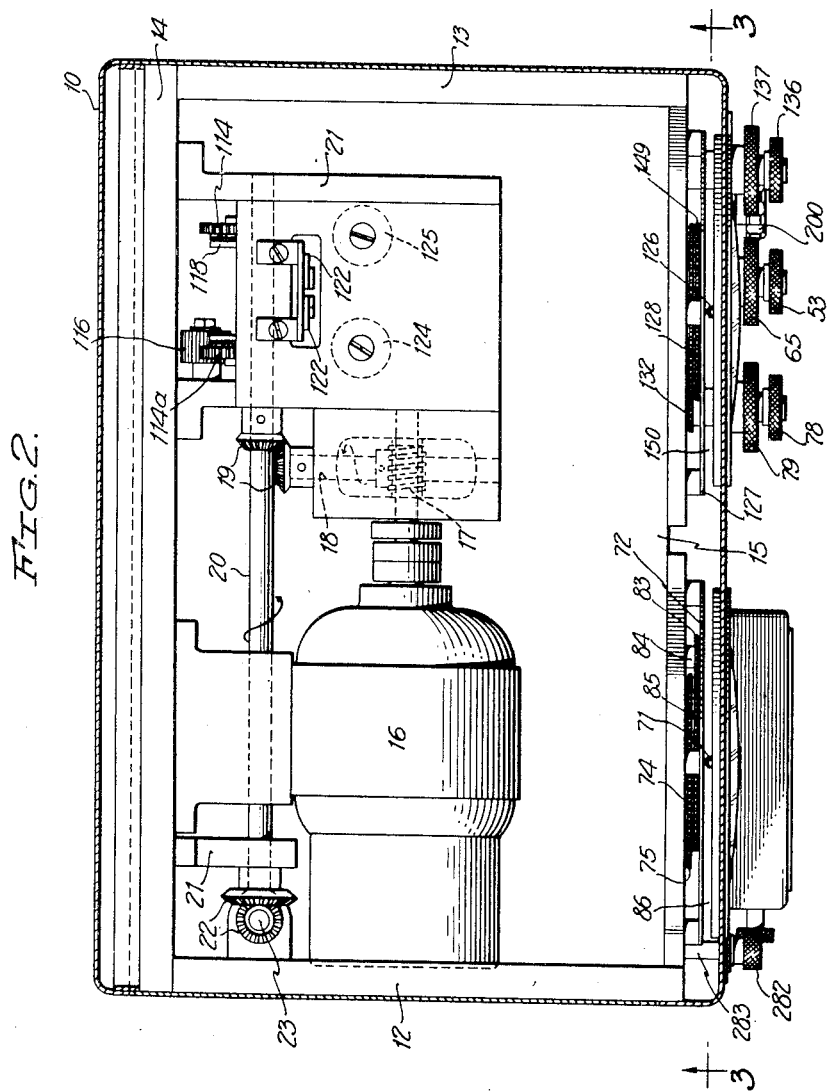
Fig. 2 is a plan view along lines 2—2 of Fig. 1.
Figure 3:
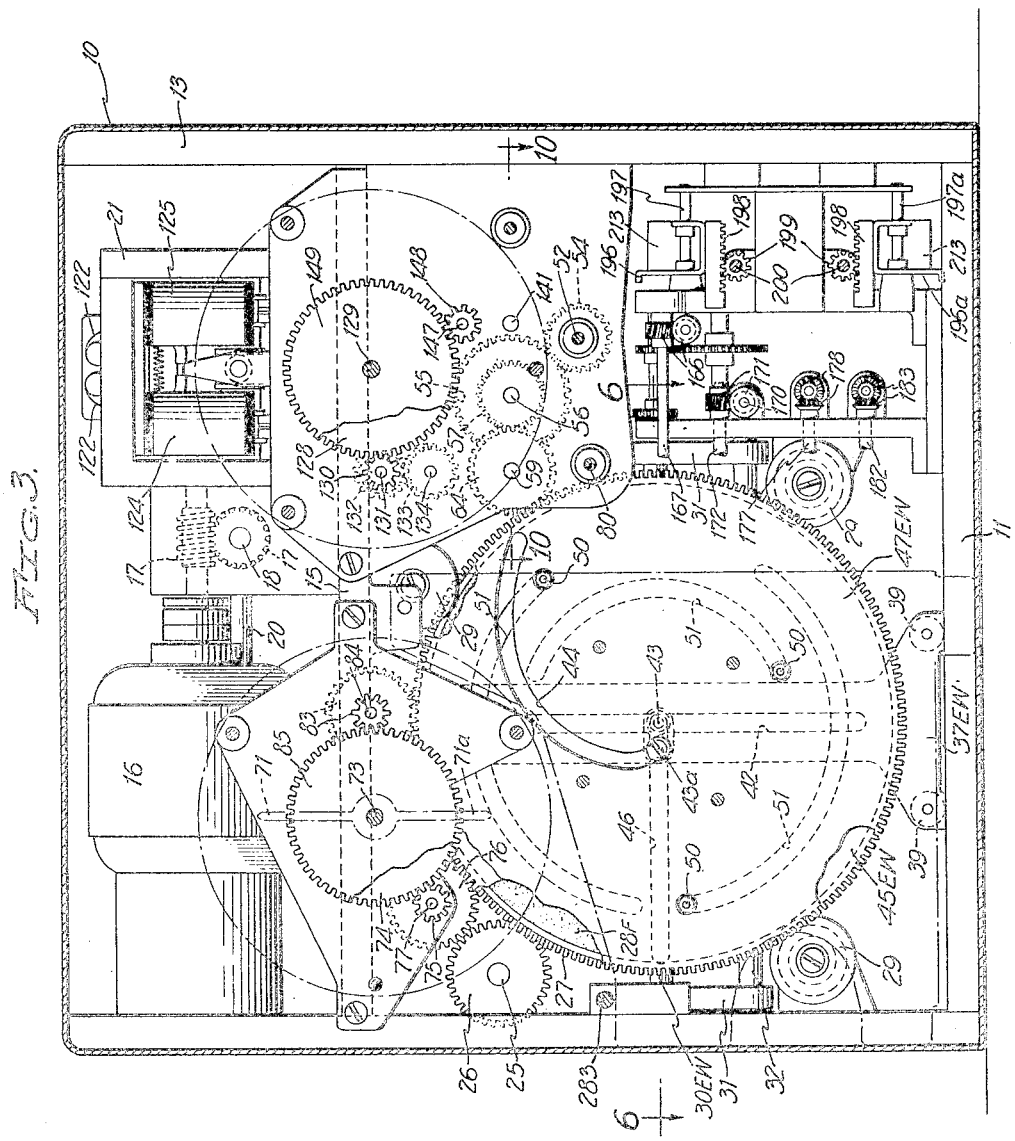
Fig. 3 is an elevation along lines 3—3 of Fig. 2 in a plane parallel to the plane of Fig. 1.
Figure 4:
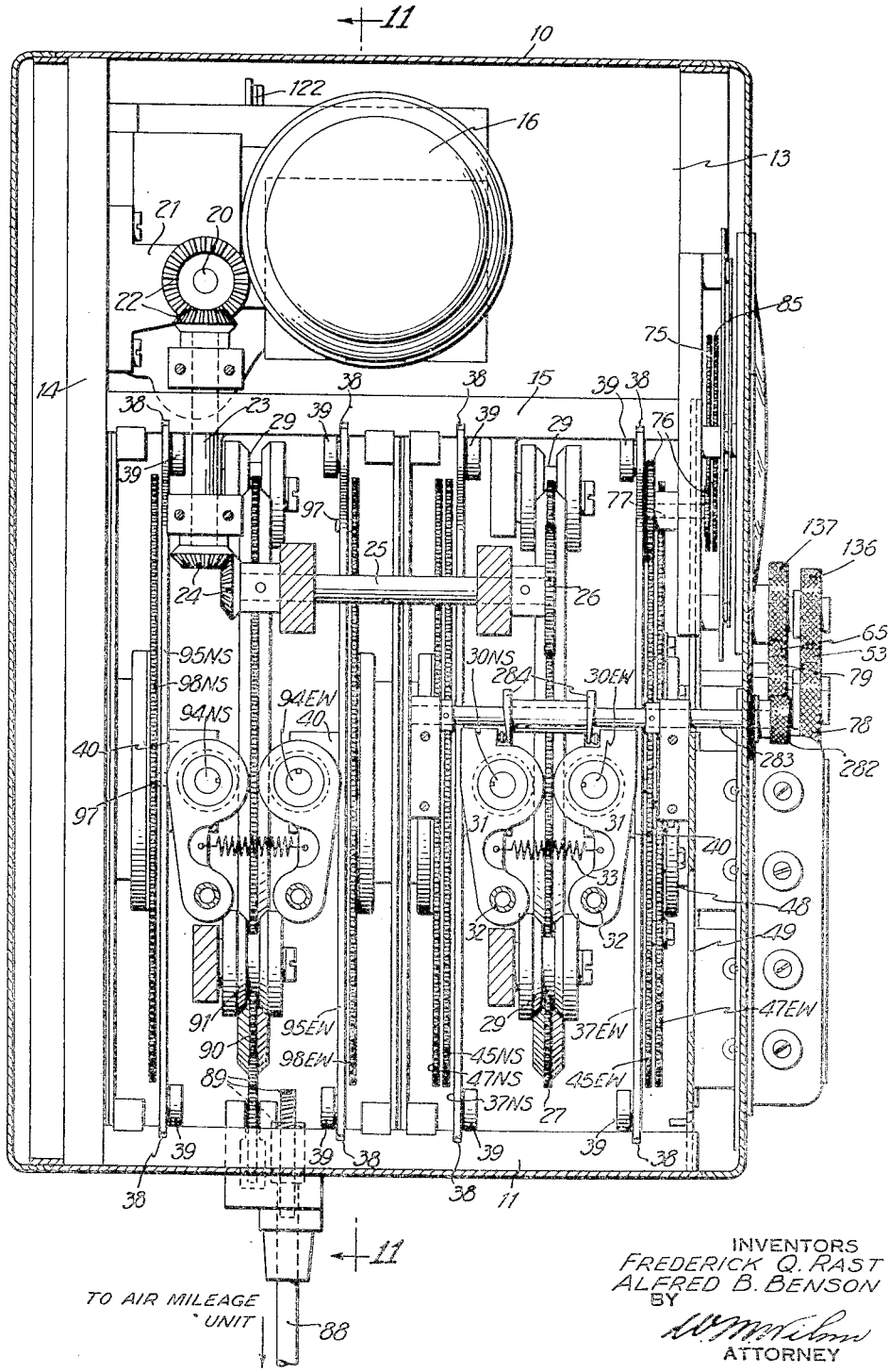
Fig. 4 is a side elevation looking in the direction of lines 4—4 of Fig. 1.

In Figs. 2, 3 and 15 constant speed motor 16 supported on rear frame 14 receives current continuously from a suitable source of direct current. Through worm and worm wheel 17 it drives a shaft 18 which in turn through bevel gears 19 drives a shaft 20 supported in brackets 21. Shaft 20 through bevel gears 22 at its left end (Figs. 2 and 4) drives vertical shaft 23 whose lower end through bevel gears 24 drives a short horizontal shaft 25. At the opposite end of shaft 25 is secured a gear 26 meshing with a ring gear 27 (Fig. 3), so that the latter is constantly driven in a counterclockwise direction.

Figure 6:
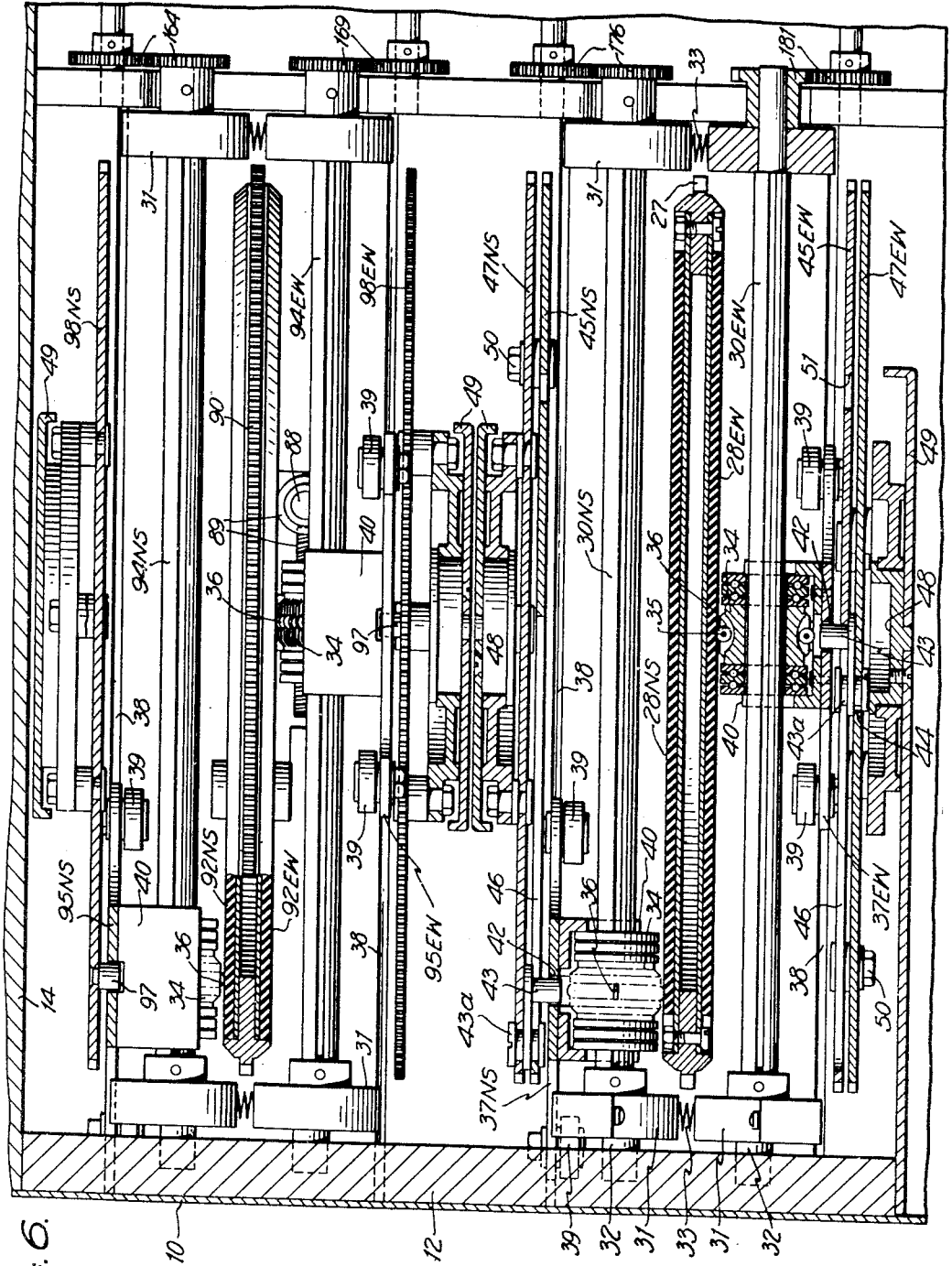
Fig. 6 is a plan section taken on lines 6—6 of Fig. 3.

Referring to Fig. 6, gear 27 has secured on opposite sides thereof a pair of friction plates or disks 28NS and 28EW. The gear 27 is supported for rotation by three beveled roller bearings 29 spaced about the periphery of the gear as shown in Fig. 3 and rotatable in suitable brackets attached to the fixed framework of the apparatus (see Fig. 4). Thus, the gear 27 is fully rotatable in a cradle formed by the three external points of support.

Extending transversely across the horizontal axis of gear 27 is a pair of shafts 30NS and 30EW (Figs. 4 and 6) whose ends are supported in arms 31 pivoted at 32 to the fixed framework. Springs 33 connected between the arms of each end pair serve to urge the shafts 30NS and 30EW toward disks 28NS and 28EW respectively.

Shafts 30NS and 30EW have each mounted thereon a roller 34 slidably keyed to the shaft for rotation but free to move longitudinally on the shaft. The roller 34 is slotted lengthwise and held in each slot by a circular wire 35 is a wheel 36 (Fig. 12) freely rotatable on the wire. The wheels 36, due to the tension of springs 33, press firmly against disks 28NS and 28EW and, as the disks are driven, motion will be transmitted to rollers 34 through wheels 36, except when the roller is located on the axis of rotation of the disk.

Through compass controlled mechanism, the rollers 34 are moved along their shafts 30NS and 30EW and, as they do so, the wheels 36 roll across the faces of the disk so that all frictional resistance to such movement is avoided. The wheels 36 are quite small and numerous, so that as the disks 28NS and 28EW rotate, the edges of wheels 36 bite into the frictional material of the disk to effect a firm rotation of the rollers 34 without slippage.

The manner in which rollers 34 are slid along their respective shafts will now be explained. Extending in a plane parallel to gear 27 (Figs. 4 and 6) are plates 37NS and 37EW whose upper and lower edges are slidable in grooves 38 in the base frame 11 and cross frame 15. Rollers 39 carried by the plates 37 ride on the surfaces of the frames 11 and 15 to facilitate the sliding of the plate in the grooves 38. Box-like frames 40 (Fig. 12) integral with plates 37NS and 37EW are notched to straddle shafts 30NS and 30EW and also hold rollers 34 between suitable thrust bearings. Thus, lateral movement of plates 37NS and 37EW will carry rollers 34 along the shafts but will not interfere with the movement of the rollers toward or away from the disks 28NS and 28EW.

Plate 37EW is provided with a vertical slot 42 (Figs. 3 and 6) into which a pin 43 extends (Fig. 6). This pin extends through a radial slot 46 in gear 45EW and is integral with an offset pin 43a extending into a cam slot 44 in gear 47EW. Gear 47EW is mounted for rotation on a bearing 48 supported by a fixed bracket 49 and gear 45EW is supported by pins 50 secured in gear 47EW and riding in concentric slots 51 in gear 45EW.

With the two gears 45EW and 47EW in the relative position of Fig. 3, pin 43 is in the center of the gears and roller 34 (Fig. 6) is in the center of the driving disk 28EW, so that no motion is transmitted to the related roller 34 or shaft 30EW. Gear 45EW, termed the direction gear, is manually adjustable to represent wind direction and gear 47EW, termed the velocity gear, is manually adjustable to represent wind velocity. The result of relative positioning of these gears will position pin 43 and through it will shift plate 37EW to a point on the surface of driving disk 28EW, so that shaft 30EW will be driven at a rate and in a direction corresponding to the north, west complement of wind direction and velocity.

The gears 45NS and 47NS are mounted in the same manner as gears 45EW and 47EW through parts identified by the same reference characters, and are also provided with the same cam slots 44 and 46 with the slot 46 displaced 90° so that the north, south roller 34 will be shifted across the face of its driving disk 28NS for operation at a rate and in a direction corresponding to the east, south component of wind direction and velocity.

Figure 9:
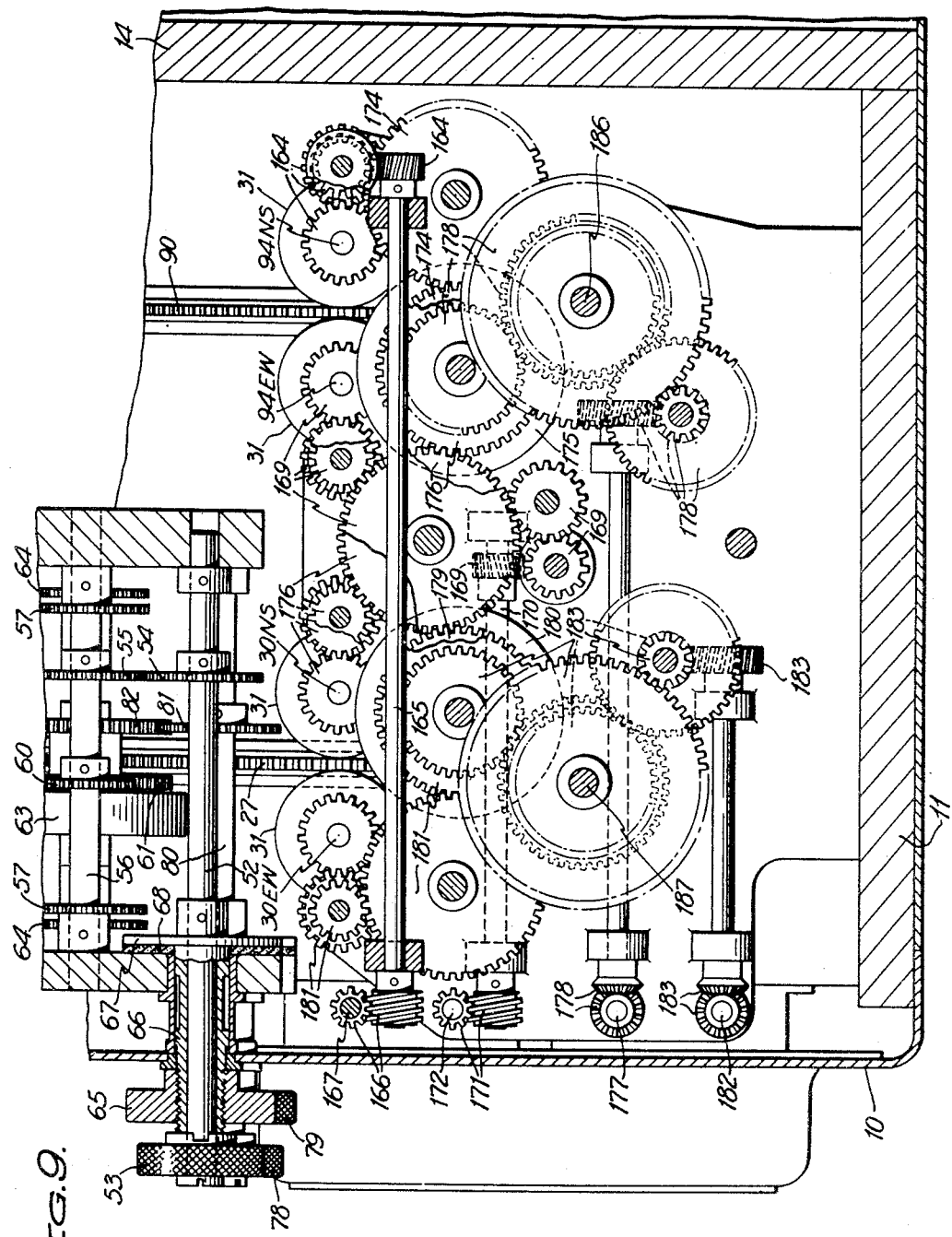
Fig. 9 is an elevation taken on lines 9—9 of Fig. 7.

The manner in which wind direction is set into the device will now be explained. In Figs. 9 and 15, a shaft 52 has a knob 53 by means of which the shaft may be rotated and through gear 54 on the shaft meshing with gear 55 a shaft 56 is turned. This shaft 56 (Fig. 10) has two gears 57 secured thereto which through gears 58 free on a shaft 59 drive gears 45EW and 45NS. Shaft 56 has a third gear 60 secured thereto which drives a gear 61 loose on shaft 59. This latter gear carries a differential pinion 70 meshing with sun gear 62 and with internal gear teeth of differential cage 63. With gear 62 stationary, cage 63 will be driven and, as it is pinned to shaft 59, this shaft will also turn and through gears 64 affixed thereto will drive gears 47EW and 47NS. Thus, turning of knob 53 will rotate gears 45NS, 45EW, 47NS and 47EW an amount and in a direction representing wind direction. A locking device (Fig. 9) is provided for shaft 52 which comprises a locking knob 65 which, when tightened, will draw sleeve 66 toward the left and force a disk 67 pinned to the shaft and integral with the sleeve against a stationary friction plate 68.

The wind direction is indicated by the position of pointer 71 (Fig. 1) around the face of a fixed dial 72 and this pointer is directly connected to the direction gear 45EW as follows. The pointer is secured on a stem 73 to which is secured a gear 74 (Figs. 3 and 15) meshing with a gear 75, which through gear 76 and rod 77 connects with gear 45EW. The knob 53 is turned until pointer 71 indicates the desired wind direction.

Wind velocity is set in by means of knob 78 (Figs. 1, 9, 10 and 15) which is also provided with a locking knob 79 and which turns a shaft 80 with a gear 81 secured thereon. Gear 81 drives gear 82 integral with sun gear 62 free on shaft 59, and with gear 61 stationary cage 63 will be driven through pinion 70 (Fig. 10) and through shaft 59 and gear 64 the velocity gears 47NS and 47EW will be displaced relatively to the gears 45. Gear 47EW through gears 83 and rod 84 (Fig. 3) drives a gear 85 loose on pointer rod 73, and this gear 85 has connected thereto a shield 86 (Figs. 1 and 15) which accordingly is displaced to indicate wind velocity with respect to pointer 71a.

Briefly summarizing the manually set wind direction and velocity integrating mechanism, the drive gear 27 is constantly driven at a predetermined rate, and rollers 34 are positioned to be driven thereby and to in turn drive shafts 30EW and 30NS at rates and in directions proportional to the wind velocity and direction.

The values so derived will be integrated with values representing air miles to obtain actual or ground miles traveled through mechanism now to be described.

Referring to Fig. 15, 87 represents a so-called air mileage unit of known construction, which drives a shaft 88 at a rate proportional to the air mileage of the plane in which the device is carried. In Figs. 10 and 11, shaft 88 through gearing generally designated 89 drives a gear 90 mounted for rotation in exactly the same manner as gear 27 on beveled rollers 91. Contacting friction disks 92NS and 92EW are rollers 34 slidable on shafts 94NS and 94EW (Fig. 6). These rollers are supported in box frames 40 secured to frames 95NS and 95EW similar to frames 37 and similarly supported in grooves cut into the framework of the device. Each frame has a slot 96 (Fig. 11) to receive a pin 97 carried by gear 98EW and 98NS respectively. There is a 90° displacement between the two pins 97, so that when pin 97 of gear 98EW is in the position shown in Fig. 11 the pin 97 of gear 98NS is 90° removed in a counterclockwise direction.

Gears 98EW and 98NS are driven together from a pair of gears 99 secured to a common shaft 100 (Figs. 10 and 11) which is in turn driven by gears 101 on shaft 102. A gear 103 on shaft 102 meshes with a gear 104 on a shaft 105 to which there is secured a bevel gear 106 meshing with bevel gear 107 on a vertical shaft 108.

At the upper end of shaft 108 is a helical gear 109 meshing with gear 110 on shaft 111 which carries two gears 112 and 113 of which gear 112 meshes directly with a gear 114 loose on shaft 20 and gear 113 meshes with gear 114a also loose on shaft 20 through an idler 115. Shaft 20 is constantly driven from motor 16 as already explained, and either gear 114 or 114a may be clutched to this shaft to drive the gears 98NS and 98EW in one direction or the other through the gear connections just traced.

Slidably keyed to shaft 20 is clutch driving element 117 having serrated face plates 118 adjacent to gears 114 and 114a, which latter have serrated clutch faces. A lever 119 pivoted at 120 has a roller 121 riding in a circular channel in element 117 and is normally held in a central position by spring urged fingers 122, in which position both clutches are out of engagement. Integral with lever 119 is a pair of armatures 123 adjacent to a pair of magnets 124 and 125 which, when energized, will engage the related clutch to drive the connected train of gears.

Figure 5:
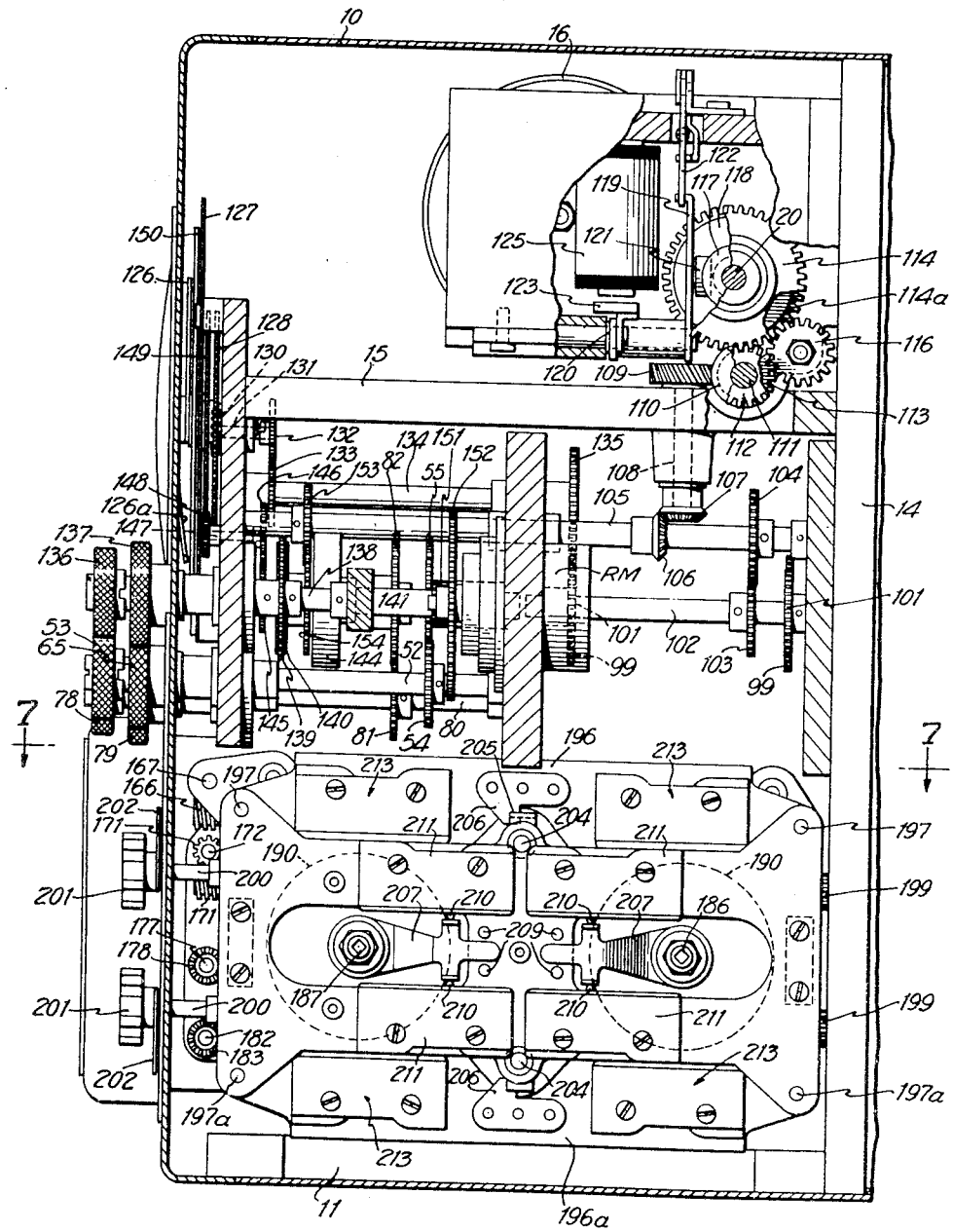
Fig. 5 is a side elevation looking in the direction of lines 5—5 of Fig. 1.

These magnets are selectively energized under control of a compass through circuits yet to be explained to position gears 98EW and 98NS in accordance with the direction in which the plane is headed. This direction is indicated by a pointer 126 (Fig. 1) traversing a fixed compass chart 127. The pointer has integral therewith a gear 128 (Fig. 3) fixed to stem 129 meshing with a pinion 130 on a stem 131 (Fig. 5). Stem 131 has a pinion 132 meshing with a pinion 133 on shaft 134 whose opposite end has a gear 135 driven by one of the gears 101, so that pointer 126 moves directly with the course set by the train of gears.

To compensate for magnetic variation, knob 136 (Figs. 1, 5 and 15) is rotated upon release of locking knob 137, to turn shaft 138, and through gear 139 thereon turn gear 140 loose on shaft 141. Gear 140 is integral with sun gear 142 of a differential and through pinion 143 will turn cage 144 fixed to shaft 141 (see Fig. 1). Shaft 141 has a gear 145 secured thereto (Figs. 3 and 5) meshing with a gear 146 on stem 147, which latter carries a pinion 148 meshing with a gear 149 integral with a shield 150 (Fig. 1). Thus, rotation of knob 136 displaces shield 150 with respect to pointer 126a in accordance with the magnetic variation required.

In Figs. 10 and 15, shaft 141 carries a pinion 151 which drives a gear 152 on the rotor shaft of a three phase synchronous motor designated RM. Shaft 105, which is clutch driven in either direction as explained, has a gear 153 thereon meshing with gear 154 of the differential so that, after the initial setting for magnetic deviation has been made, rocking of shaft 105 will cause similar rocking of shaft 141 and corresponding turning of the rotor shaft of motor RM.

Referring now to Fig. 13, SM represents a three phase motor which rotor shaft is suitably controlled from a known type of a gyro stabilized earth induction compass to take angular positions in accordance with compass settings. The rotor winding 155 of this motor SM is supplied with 26 volts 400 cycle current from a transformer 156, which current sets up an alternating flux field to induce a 400 cycle three phase voltage in the stator windings. The values of voltage induced in the three phases are determined by the angular position of the rotor. The three phase signal voltage, when represented on the stator of the receiving motor RM through wires 157, induces a single phase voltage in its rotor, which induced voltage varies in phase and magnitude as the angular relationship changes between the rotors of the transmitting and receiving motors. When the rotors are in precisely the same angular position, relative to their stators, no voltage is induced in the rotor of the receiving motor RM. As the rotor of the transmitting motor SM is moved clockwise or counterclockwise, voltage will be induced in the rotor of motor SM. One direction of rotation produces an induced voltage in phase with the original supply voltage and the other direction of rotation produces an induced voltage 180° out of phase with the original supply voltage.

This induced voltage is applied to the primary winding of a coupling transformer 158. The grids of control tubes 159 are connected to opposite ends of the secondary winding of transformer 158. Thus, when one grid is positive, the other is negative. Therefore, only one grid will be positive at the same time that the plates of tubes 159 are positive, and as the signal voltage is shifted from in phase to 180° out of phase relative to the supply voltage the positive grid, positive plate condition necessary for conduction will shift from one tube to the other. Clutch magnets 124 and 125 are in the plate circuits of tubes 159 and, since the magnets when energized connect the rotor shaft of motor RM for driving in opposite angular directions, it will always be returned to the position of no signal voltage which will correspond to the angular position of the rotor of the transmitting motor SM. The bias on the control tubes is set so the magnets will drive the rotor of motor RM slightly past its null position, at which time it will be returned to the other side of its null position. This results in a constant hunt about the null position.

Setting of the bias is accomplished by utilizing the voltage drop which appears across the resistor 160 in the circuit of the tube heaters. A potentiometer 161 is bridged across a section of resistor 160 and the bias voltage is impressed through wire 162 on the center tap of the grid signal transformer 158. Since the plates of tubes 159 are connected to the 400 cycle A. C. supply, the current in the magnets 124, 125 is pulsating D. C. To smooth this and prevent chattering of the clutches, condensers 163 are connected in parallel with the magnets.

Briefly, then, for a given compass setting represented on motor RM one of the clutch magnets 124 or 125 is operated to drive the intergrating gears 98EW, 98NS and the rotor of RM until the rotor settings are the same and then the repeated overthrow or hunting action takes place with the rotor of RM oscillating through an adjusted angle while gears 98EW, 98NS also oscillate through the same angle.

Figure 7:
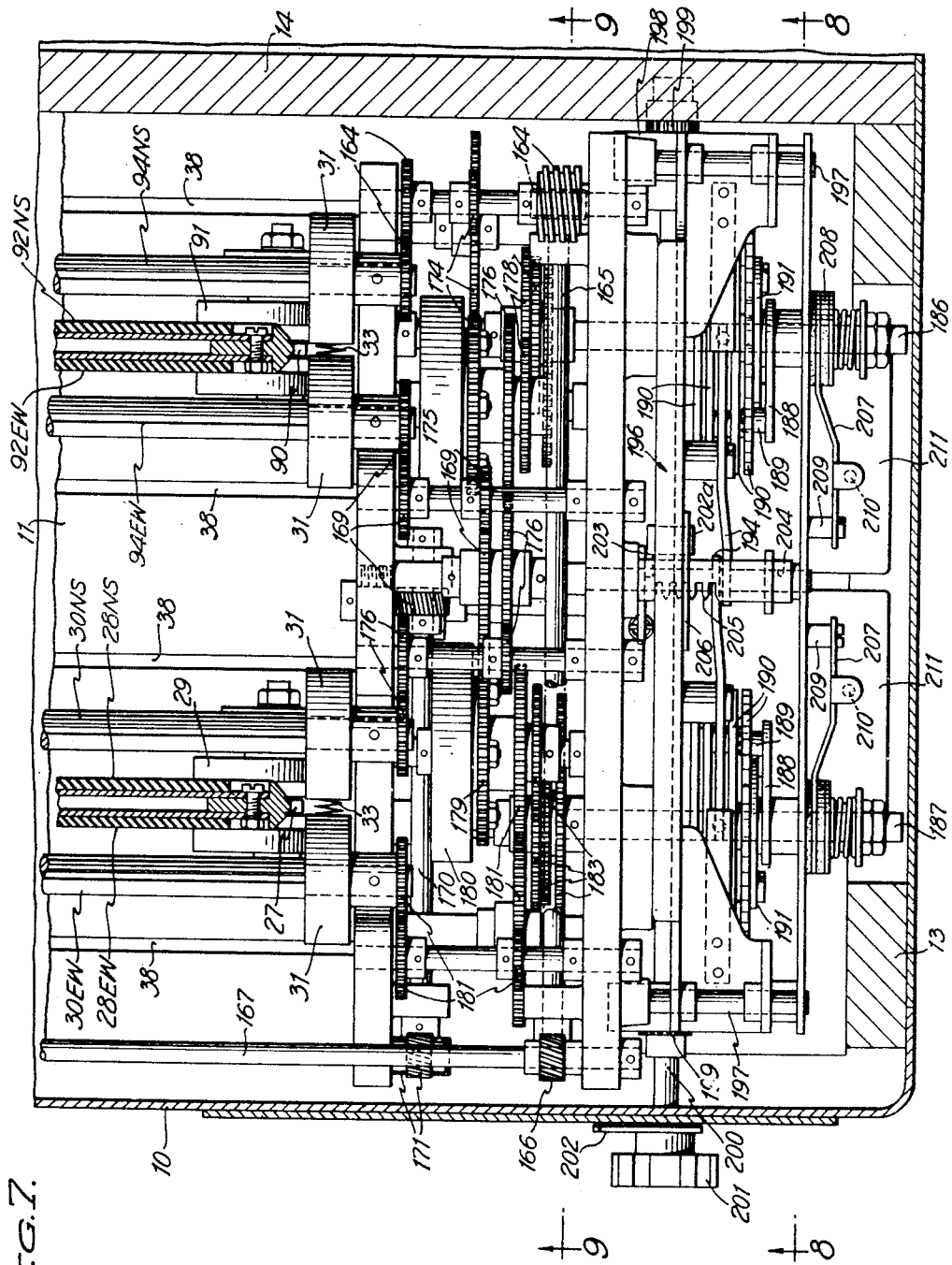
Fig. 7 is a plan section taken on lines 7—7 of Fig. 5.

Referring now to Figs. 7 and 9, shaft 94NS through gearing designated 164 drives a cross shaft 165 which through gears 166 drives a shaft 167 whose left end (Fig. 1) drives a double counter 168 to indicate therein the air miles traveled north or south. This counter is of well known type with the wheels of the N side turning in the opposite direction from the wheels of the S side, so that one side shows positive mileage and the other shows negative mileage. Shutters (not shown) are provided internally of the counter to shield the negative reading. In Fig. 15 this drive is shown diagrammatically with a simplified gear arrangement.

Shaft 94EW, through gearing designated 169, drives a cross shaft 170 which through gears 171 drives a shaft 172 whose left end (Fig. 1) drives a double counter 173 to indicate therein the air miles traveled east and west.

The air mileage is integrated or algebraically combined with the wind through a differential gear arrangement to produce ground miles in the following manner best explained in connection with Fig. 15. The shaft 94NS through gearing 174 drives the planetary gear of a differential 175 while shaft 30NS through gearing 176 drives the sun gear. The output represented by resultant movement of the cage of differential 175 drives shaft 177 through gearing generally designated 178.

In like manner shaft 94EW through gearing 179 drives the planetary gear of a differential 180 while shaft 30EW through gearing 181 drives the sun gear. The output represented by resultant movement of the cage of differential 180 drives shaft 182 through gearing generally designated 183. Shafts 177 and 182 drive counters 184 and 185 respectively, and these are of the same type as counters 168 and 173.

Figure 8:
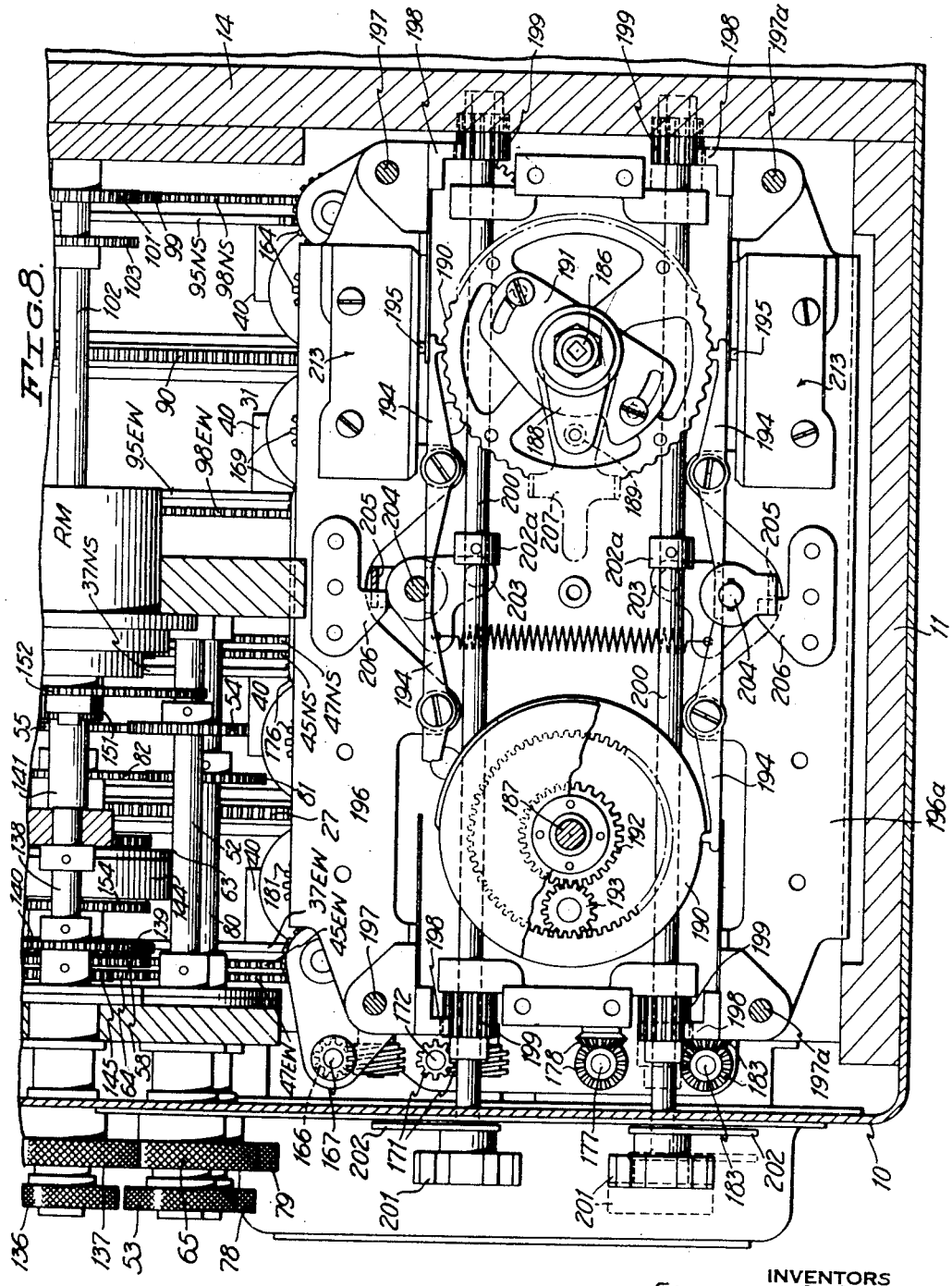
Fig. 8 is an elevation taken on lines 8—8 of Fig. 7.

To control the operation of the recording unit of the apparatus, gearing 178 drives a shaft 186 and gearing 183 drives a shaft 187 (Figs. 15 and 9). On each shaft 187 and 186 are mounted five so-called impulse cams secured in the following manner. In Fig. 16 shaft 187 has pinned thereto an arm 188 which accordingly turns clockwise when the plane travels east and counterclockwise when the plane travels west. Since this shaft "hunts" or oscillates when heading in a straight line, arm 188 also oscillates. A pin 189 in arm 188 thus moves between a spoke of a cam 190 and a plate 191 (see Fig. 8 where the same reference characters apply to elements on shaft 186), which is adjustably secured to cam 190. This plate is adjusted so the edge of the spoke and plate 191 correspond to the hunting angle, and thus the hunting effect is not transmitted to the cams. The cams 190 are numbered 1 to 5 and the cams 2 to 5 are pinned together so that, when arm 188 is advanced, pin 189 will drive the cams with shaft 187 or 186 as the case may be. Integral with the 2 to 5 cams is a gear 192 which through a pinion 193 drives the 1 cam 190 through internal teeth cut therein at half the rate of cams 2 to 5.

The 5 cam has fifty cam rises or lobes about its periphery, the 4 cam has ten cam rises about its periphery, the 3 cam has two cam rises about its periphery, the 2 cam has one cam rise about its periphery, and the 1 cam has one cam rise about its periphery.

As they rotate, a selected cam in each set of five will cooperate with a lever 194 to operate a contact plunger 195 of a well known "micro switch" type of contact designated 213 and the frequency of operation of lever 194 will, of course, vary with the cam selected. Four levers 194 are provided with a pair for each set of cams acting on diametrically opposite sides of the cams. The two upper levers 194 (Fig. 8) are pivoted on a carriage 196 which is slidable on rods 197. The two lower levers 194 are similarly pivoted on a carriage 196a which is slidable on rods 197a.

Both carriages are provided with racks 198 (Fig. 3) engaged by pinions 199 on rods 200 which have hand knobs 201 and pointers 202 at their extremities (see Fig. 1). To shift lever 194 into position over any of the five cams 190, knob 201 is first drawn to the left as viewed in Fig. 8 to slide rod 200 likewise. A collar 202a thereupon rocks bell crank 203 on rod 204 which has a flat surface that acts to rock the levers 194 out of engagement with the cams 190. Rod 204 has a multitoothed arm 205 (Fig. 7) which rocks out of engagement with a tooth 206 on carriage 196, so that the carriage may now be slid along rods 197 by rotation of knob 201. With levers 194 in the desired position indicated by the pointer 202, knob 201 is moved back again to return arm 205 to locking position and to lower levers 194 into engagement with the selected cams 190. The upper and lower knobs 201 are independently operable so that their respective carriages may be in any one of five positions.

Referring now to Figs. 5, 7 and 16, on the end of each of shafts 186 and 187 is an arm 207 free on the shaft and constrained to turn therewith by friction washers 208 secured to the shafts and spring pressed against the arm 207. Pins 209 limit the movement of arms 207, so that they move only far enough to operate contact pins 210 of sealed contacts in switch housings 211.

The contacts operated by pins 210 and 195 are shown in the circuit diagram (Fig. 14) where pins 210 shift contacts 212N, 212S, 212W and 212E and pins 195 shift contacts 213. The contacts 212 are wired to four magnets 214 for the upper set and four magnets 214 for the lower set designated W, E, N and S. Each set of four magnets 214 controls a separate recording mechanism and a separate switch 215 is provided for each set of magnets. If only one recorder is used, only one of the switches 215 is closed to send current to a pair of lines 216, 217 and related recorder motor 218. If now the plane is heading west, shaft 187 is turning counterclockwise and contacts 212W are closed. As cams 190 turn, a high portion upon engaging lever 194 will close contacts 213 to complete a circuit from line 216, contacts 213, contacts 212W and the W magnet 214 to line 217. Magnet W remains energized until contacts 213 open again. In like manner the other E, N and S magnets 214 are energized depending upon the direction of rotation of shafts 186, 187 and the particular cams 190 selected for control.

Figure 17:
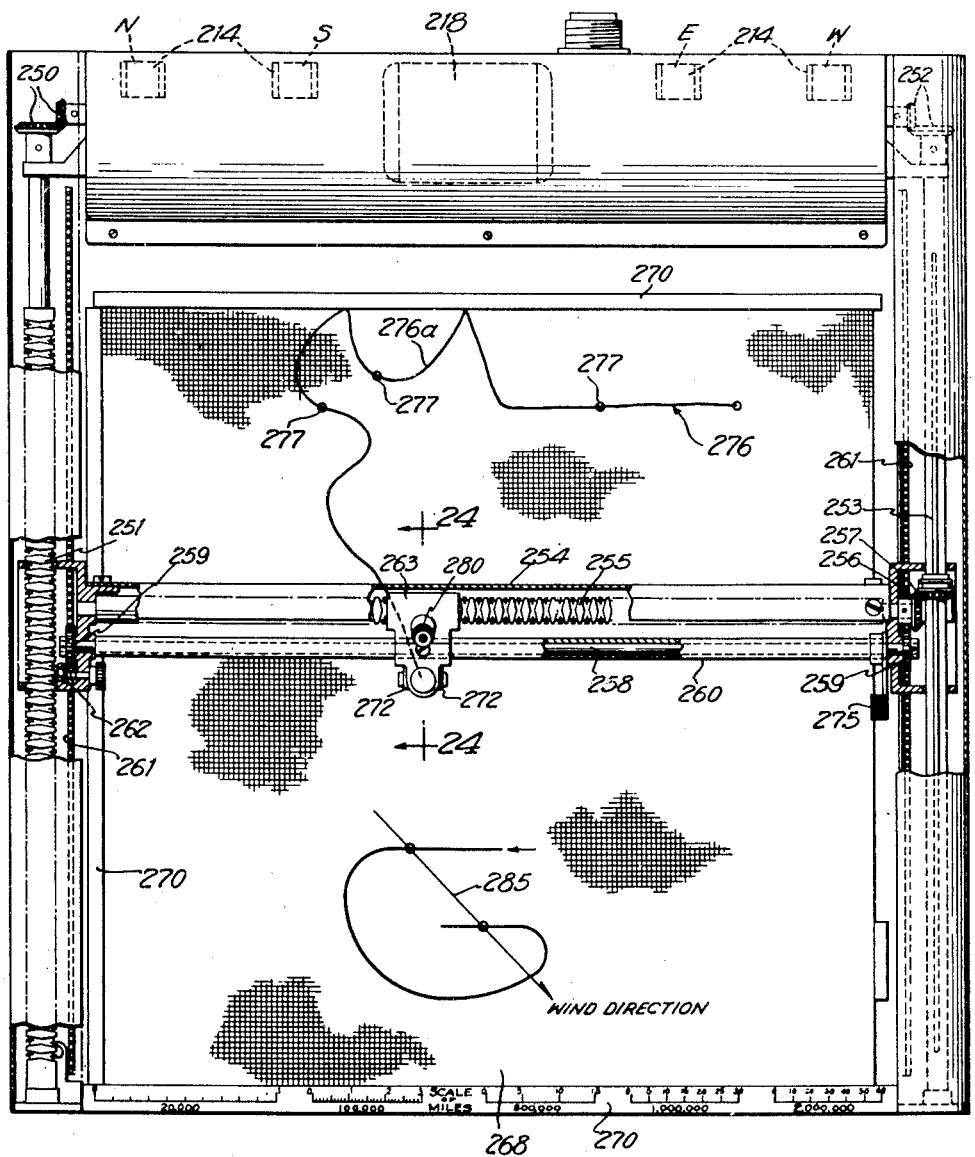
Fig. 17 is a plan of the recording unit.

The recording mechanism controlled by motor 218 and magnets 214 will now be described with particular reference to Fig. 17. The mechanism controlled by the N and S magnets 214 is the same as that controlled by the E and W magnets 214, so that the following description of the former will serve to also explain the latter and the same reference characters will be applied to like parts in both.

Motor 218 drives a drum 220 (Figs. 18 and 22) to which are pivoted spring urged centrifugal pawls 221 which, when the motor has attained speed, will engage and drive ratchet 222 integral with a worm 223 (Fig. 18). This worm, through gear 224 (Fig. 21), shaft 225 and bevel gears 226 drives a shaft 227. Gears 228 are pinned to this shaft and are thus in constant rotation and each drives a gear 229 and integral clutch shell 230 free on a shaft 231.

Within shell 230 (Fig. 20) is a cam 232 fixed on shaft 231 and spaced spring pressed balls 233. Pins 234 normally engage balls 233 to hold them against spring action so that rotation of shell 230 does not drive the balls 233 or cam 232. Pins 234 are held in the position shown by a disk 235 in which they are carried (Fig. 19) and integral with this disk is an escapement ratchet 236 engaged by an escapement lever 237 pivoted at 238.

Energization of S magnet 214 will rock lever 237 to move one of its stopping fingers out of the path of the teeth of ratchet 236, and the other finger into the path to allow a half tooth advance of the ratchet and disk 235. This is effected by the clutch springs bearing against balls 233 and now released pins 234 in disk 235, with the balls moving into the wedge shaped openings between cam 232 and the rim of shell 230 to effect a coupling action, so that shaft 231 is driven one step. After a tenth of a revolution of ratchet 236, that is, when the next tooth is engaged by a finger of arm 237, pins 234 are stopped and will cam balls 233 out of clutching engagement.

With this structure, energization of magnet 214 causes a step of advance of shaft 231 and subsequent deenergization causes another step of advance. At one end of shaft 231 is a ball type of overrunning clutch generally designated 239 which acts to prevent retrograde movement of the shaft. At its other end shaft 231 carries a gear 240 meshing with a gear 241 rotatable on a stud 242. The corresponding gear 240 on shaft 231 controlled by the N magnet 214 (Fig. 18) drives a gear 243 free on a shaft 244NS coaxial with stud 242. Gear 241 carries pinions 245 meshing with a gear 246 fixed to shaft 244NS (Fig. 23) and with an internal gear 247 secured to gear 243. When driving is effected under control of S magnet 214, gear 247 is stationary and shaft 244NS will be driven clockwise as viewed in Fig. 23. When driving is effected under control of N magnet 214, gear 241 is stationary and shaft 244NS will be driven counterclockwise.

Through similar mechanism, shaft 244EW (Fig. 21) will be driven in one direction under control of the E magnet 214 and in the opposite direction under control of the W magnet 214. In Figs. 17 and 21 shaft 244NS through bevel gears 250 drives a double or reverse threaded shaft 251 and shaft 244EW through gears 252 drives a splined shaft 253. A carriage 254 is freely slidable along shafts 251 and 253 and supports therein a double or reverse threaded shaft 255 which has a bevel gear 256 meshing with a bevel gear 257 on shaft 253. Gear 257 is mounted in carriage 254 for sliding therewith and is rotated by shaft 253, so that threaded shaft 255 is rotated with the carriage in any position along shaft 253. An equalizing shaft 258 in a sleeve 260 supported in the carriage has a gear 259 at each end meshing with stationary racks 261. At the left end of carriage 254 is supported a spring pressed nut 262 comprising a single tooth engaging in the threads of shaft 251 so that, as the shaft rotates, the carriage will move up or down.

Straddling shaft 255 and sleeve 260 (Fig. 24) is a frame 263 in which there is also supported a spring pressed nut 264 comprising a single tooth engaging in the threads of shaft 255, so that as this shaft rotates the frame 263 will move sideways. The frame 263 supports a tube 265 in which there is disposed a pencil mechanism of the propel-repel type designated generally as 266. A spring 267 serves to cause the pencil to bear down against paper or chart 268, so that as the shafts 255 and 251 rotate to move the pencil in any direction across the surface of paper 268 a line will be drawn thereon. Guide scales 270 (Fig. 17) serve to locate the paper or chart 268 and any suitable clamping means may be provided to hold it in place.

Surrounding the tip of pencil 266 is an ink saturated wick 271 (Fig. 24) carried by a sleeve 274 slidable on tube 265. This sleeve has pin connection with arms 272 whose common bushing 273 is slidable on sleeve 260. One side of sleeve 260 is flattened to cooperate with a flat on bushing 273 so that, if sleeve 260 is rocked, arms 272 will also rock to move wick 271 against the paper and mark a circle thereon intersecting the line drawn by the pencil. In Fig. 17 sleeve 260 has a finger lever 275 that may be manually rocked to effect such marking. The sleeve is normally held in non-marking position by a flat spring 286 (Fig. 24) wrapped around the bushing 273, one end held by the carrier and the other end having projections engaging the arms 272 tending to urge them upward.

Paper 268 is generally cross-section paper or a map and, when the plane is in flight, a line 276 will be drawn to record the path of flight along which circles 277 may be manually made to identify particular points of interest passed over in the course of the flight.

A particular feature of the recorder lies in the use of reverse threads on shafts 251 and 255 which, when the pencil reaches the limit of the plotting area in any direction, will automatically reverse the direction of movement of the pencil. The course of the flight beyond the plotting area will thus be recorded in reverse as shown by portion 276a of line 276. In this way no part of the path of flight can be lost due to the pencil running off the edge of the sheet.

When the pencil travels beyond the plotting area, the drive nut (for example nut 264, Fig. 24) is turned by the reversal of threading on shaft 255, so that the stem of the nut turns to follow the changed incline of the nut. A knob 280 integral with the nut will turn with it and a scribed line 281 thereon will thus indicate by its angular position whether the pencil is On or Off, that is, within or without the limits of the sheet.

The scale at which the line 276 is drawn is determined by the selection of cams 190 by knobs 200 (Fig. 1). These cams as explained send impulses to the recorder clutch magnets to advance the pencil in increments or steps with the pencil advancing a greater number of steps for a given distance at the larger scales than for the smaller scales and taking a direction as determined by energization of the magnets 214.

Briefly summarizing the operation of the apparatus, the operator turns knob 53 (Fig. 1) until pointer 71 is at the given wind direction setting. He also turns knob 78 until shield 86 is displaced with respect to pointer 71a. To compensate for magnetic variation, knob 136 is adjusted to displace shield 150 with respect to pointer 126a. A further setting is made through knob 200 to select the scale at which the course is to be recorded on the map tables. Referring to Fig. 15, the manually set wind direction and velocity enter into the integrating mechanism to control the driving of rollers 34 by disks 28NS and 28EW at rates and in directions proportional to wind velocity and direction to in turn drive shafts 30NS and 30WE. Air mileage derived from the unit 87 drives the upper integrating mechanism in which gears 98NS and 98EW are driven under compass control so that for a given compass setting the gears 98NS and 98EW will be driven through appropriate angles to position their rollers 34 along disks 92NS and 92EW and in turn drive shafts 94NS and 94EW at rates in directions proportional to air mileage and direction of the plane.

The air mileage is integrated with the wind settings to produce ground miles represented by speed and direction of shafts 186, 187. These in turn through the cams 190 and circuits operated thereby control the recording apparatus.

Provision is made for disabling the wind direction and velocity integrating devices to cause the counters and recorder to register only air miles. This is effected by turning knob 282 (Fig. 1) to its Off position. This knob (Fig. 4) turns a rod 283 and a pair of face cams 284 so as to cam levers 31 and their shafts 30EW and 30NS out of contact with driving gear 27, and thus no motion will be transmitted to these shafts. This feature is useful in enabling the navigator to ascertain wind direction and velocity by means of the counters or recorder and may be done in the following manner.

The plane is flown twice over the same reference point on the ground and the time of flight between successive contacts noted. On each passage over the reference point a mark is made on the plotting paper and a line 285 (Fig. 17) is drawn joining the two points of contact. This gives the direction of the wind. The distance is measured and corrected for an hour's time to obtain the velocity and then these factors may be set into the apparatus.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In an integrating apparatus, a friction disk, means for rotating the disk at a constant rate, a pair of cams on each side of the disk and coaxial therewith, the cams of each pair being relatively rotatable on the common axis, means for effecting concurrent rotation of said cams, a frame intermediate each pair of cams and the disk, one frame positionable by the related cams, upon relative rotation thereof to represent by its position across one face of the disk the north, south component of wind velocity and the other frame positionable by its related cams upon relative rotation thereof to represent by its position across the second face of the disk the east, west component of said wind velocity, a roller for each frame positioned thereby and contacting the related disk face to be driven thereby at a rate proportional to the components of said wind factors.

2. The invention set forth in claim 1 in which a pin structure extends through the frame and also through cam slots in both related cams, said slots being configured so that joint rotation of both cams effects angular displacement of the pin structure and relative rotation of the cams effects radial displacement, said frame having a slot to receive the pin structure whereby the frame is displaced linearly in a plane parallel to the face of the disk.

3. The invention set forth in claim 1 in which a differential gear mechanism is connected between the two pairs of cams, a rod angularly settable to represent wind direction acting through said differential mechanism to integrally rotate both pairs of cams, and a rod angularly settable to represent wind velocity acting through said differential mechanism to rotate only one cam in each pair.

4. In a navigating instrument for vehicles, having integrating mechanism controlled by distance and directional devices, the combination of a first shaft rotated by said integrating mechanism at a speed and in a direction proportional to the speed of the vehicle in a north or south direction, a second shaft rotated by said integrating mechanism at a speed and in a direction proportional to the speed of the vehicle in an east or west direction, a recording device having a stylus, a quartet of impulse responsive magnets, one for each of the cardinal points of the compass, means for each magnet controlled thereby to advance the stylus in the related direction, one step for each impulse to the magnet, impulse emitting means controlled by each of said shafts, and further means controlled by each shaft for rendering the magnet corresponding to the direction of rotation of the shaft responsive to the impulse emitting means controlled by the shaft whereby the stylus will be moved according to the resultant movement of said shafts.

5. In a recorder of the class described, a stylus, movable across a plane surface, a driving motor therefor, a normally disengaged coupling between the motor and stylus, a control magnet, means effective upon energization of said magnet for causing engagement of said coupling whereby the stylus will be advanced a predetermined distance, and for causing the coupling to be then disengaged, subsequent deenergization of said magnet rendering said means effective for causing reengagement of the coupling whereby the stylus will be advanced a further distance and the coupling disengaged, and means for repeatedly energizing and deenergizing said magnet to advance the stylus a number of increments.

6. The invention set forth in claim 5 in which said last named means includes manually settable devices for selectively controlling the length of time the magnet remains energized and deenergized to thereby control the number of increments of advance in a given time interval.

7. In a recorder of the class described, a stylus movable across a plane surface, a power source for driving the stylus, an escapement mechanism, intermediate the power source and stylus, comprising an escapement wheel and a coacting oscillating verge, means for oscillating the verge to enable advance of the escapement wheel and stylus a step for each half oscillation of the verge, and selectively settable means for controlling the rate of oscillation of said verge.

8. In an integrating apparatus, a friction disk, means for rotating the disk at a constant rate, a pair of driven rollers, one engaging each face of the disk and normally engaging the disk faces at their centers of rotation, a shaft slidably keyed to each roller, each shaft extending across a face of the disk parallel to the diameter of the disk, a pair of control cams for each roller, means for angularly displacing both pairs of cams together to select the direction of movement of the rollers along said shafts in accordance with wind direction, further means for effecting rotation of one of the cams of both pairs of cams relative to the other cams of the pairs to effect a radial displacement of the rollers in the selected direction in accordance with wind velocity, the cams of one pair being displaced through an angle of 90° with respect to the cams of the other pair, whereby one roller will be driven by the friction disk at a rate proportional to the north, south component of wind velocity and the other at a rate proportional to the east, west component.

FREDERICK Q. RAST.
ALFRED B. BENSON.

REFERENCES CITED

The following references are of record in the file of this patent:

UNITED STATES PATENTS

| Number | Name | Date |
| --- | --- | --- |
| 232,156 | Thomsen | Sept. 14, 1880 |
| 919,640 | Robinson et al. | Apr. 27, 1909 |
| 1,540,737 | Connet | June 2, 1925 |
| 1,704,250 | Holmes | Mar. 5, 1929 |
| 2,022,275 | Davis | Nov. 26, 1935 |
| 2,067,719 | McCabe | Jan. 12, 1937 |
| 2,108,037 | Au | Feb. 15, 1938 |
| 2,116,508 | Colvin | May 10, 1938 |
| 2,371,378 | Clark | Mar. 13, 1945 |
| 2,390,178 | Rutherford | Dec. 4, 1945 |

FOREIGN PATENTS

| Number | Country | Date |
| --- | --- | --- |
| 85,513 | Germany | May 17, 1895 |
| 597,421 | France | Aug. 29, 1925 |
| 558,644 | Great Britain | Jan. 13, 1944 |